United States Patent Office

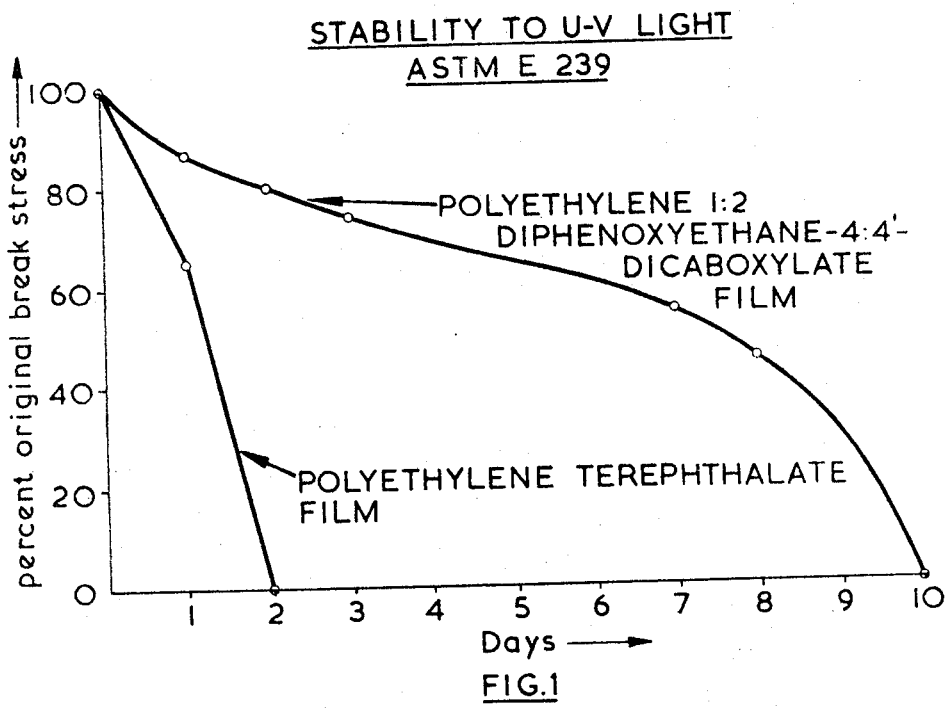
FIG.1 STABILITY TO U-V LIGHT ASTM E 239
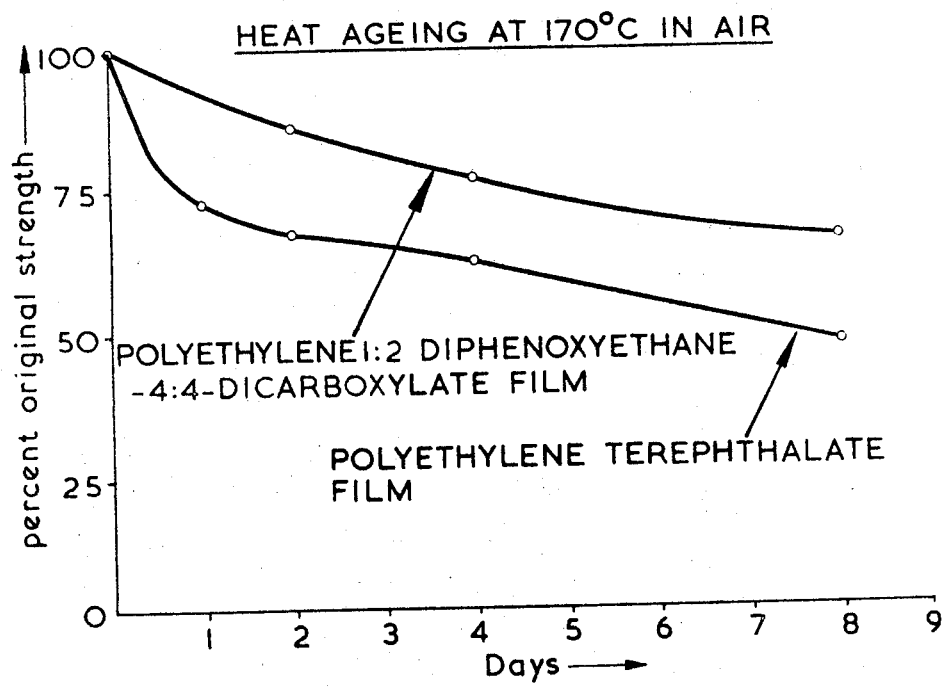
FIG.2 HEAT AGEING AT 170°C IN AIR

3,574,046
Patented Apr. 6, 1971

3,574,046
BIAXIALLY ORIENTED POLYETHYLENE-1:2-DIPHENOXYETHANE-4:4'-DICARBOXYLATE SHEETS
Richard Harold Barclay Buteux, Welwyn Garden City, England, assignor to Imperial Chemical Industries Limited, London, England
Filed Apr. 3, 1968, Ser. No. 718,615
Claims priority, application Great Britain, Apr. 20, 1967, 18,284/67; Nov. 24, 1967, 53,637/67
Int. Cl. B29d 7/24; B32b 27/36
U.S. Cl. 161—165                    3 Claims

ABSTRACT OF THE DISCLOSURE

Balanced biaxially oriented and preferably heat-set films of polyethylene - 1:2-diphenoxyethane-4:4'-dicarboxylate of 5 to 750 gauge in thickness.

---

This invention relates to new oriented films and to processes for their production.

For many applications it is desirable to use a thin film (i.e. of thickness of from 0.00005" to 0.0075") which combines high mechanical strength with stiffness (to increase ease of handling), which is thermally stable and which has good electrical insulating properties. For outdoor applications it is also desirable that the film should have a high resistance to degradation by heat and by ultraviolet light and, for packaging applications that it should have a low gas permeability.

It is an object of the present invention to produce such a film.

According to the present invention we provide films of 0.00005" to 0.0075" thick preferably 0.00005" to 0.0065" thick of polyethylene-1:2-diphenoxyethane-4:4'-dicarboxylate having in combination tensile yield strengths of at least 15,000 p.s.i., tensile break strengths of at least 20,000 p.s.i. 1% secant tensile moduli of at least $6.10^5$ p.s.i. and preferably with a shrinkage when heated for 1 minute at 200° C. of less than 4%, these properties being measured in all directions in the plane of the film said films also being resistant to degradation by heat and by ultraviolet light as hereinafter described.

These films may be produced by a process in which an appropriately thick polyethylene - 1:2 - diphenoxyethane-4:4'-dicarboxylate layer depending on the draw ratio used, is cold drawn, i.e. in the solid state, at least two times in both its machine and transverse direction to an extent such that its tensile strengths are substantially equal in both directions (hereinafter referred to as balanced film) and the film is not broken, the drawing being at a temperature which allows the film to draw without the formation of voids but with a change of the refractive index of the film, the layer being preferably maintained either before and/or after it is drawn or between the two steps of a sequential drawing process, at a temperature sufficient to cause the polymer to crystallise.

The polymeric layers used for the production of the films of our invention are preferably produced by extrusion from a slot or annular die.

The conditions used for the crystallisation of the layers or of films produced therefrom depend on whether this operation is carried out before or after drawing. When carried out after drawing, for normal rates of continuous handling of polymer films temperatures of 150 to 200° C. are appropriate for this treatment to produce a crystallised film which is dimensionally stable at temperatures up to the crystallisation temperature, the time required for the treatment being less for higher temperatures. Higher temperatures up to near to the melting point of the polymer (about 245° C.) may be used but in general are not necessary. When crystallisation is carried out before drawing lower crystallisation temperatures are normally employed. Film produced by extrusion which is not to be crystallised before drawing should be quenched to a temperature below 80° C., preferably to below 60° C. after extrusion. Film produced by extrusion which is to be crystallised before drawing may be solidified after extrusion at a temperature above 60° C. and preferably at a temperature in the range 80–125° C., thus accomplishing the crystallisation, but higher temperatures up to 220° C. may be used.

So that the films have particularly high tensile yield strengths and moduli, we prefer that they are drawn at least 3 times in both directions. The maximum draw ratios which can be applied without breaking the layers depends on the molecular weight of the polymer. We measure the molecular weight of the polymer by measuring its relative viscosity as a 1% solution in o-chlorophenol. We prefer that it has such a relative viscosity of at least 1.9 and particularly one of at least 2.0. Such relative viscosities as low as 1.7 are quite satisfactory. However, such relative viscosities above 2.5 are not desirable because unduly high extrusion temperatures are required causing some polymer degradation and also because the cost of producing the polymer is increased. The maximum draw ratio also depends on the drawing temperature and rate of drawing, as well as molecular weight and crystalline state of the polymer. Crystallised layers require a slightly lower draw ratio to effect an equal degree of orientation as shown by change of refractive index in the direction of drawing and by improvement in the tensile strength of the film. If an uncrystallised layer is drawn sequentially in one direction and then another any crystallisation occurring during the first draw affects the draw ratio required in the second draw in order to produce balanced film. Under comparable conditions crystallised layers can usually be drawn to somewhat lower draw ratios than uncrystallised layers without breaking.

The higher the rate of draw the higher the temperature required to obtain void-free film. For normal commercial rates of drawing for uncrystallised layers the temperature of drawing should be at least 70° C. For high rates of such drawing 80° C. is a suitable minimum temperature for such draws particularly if this is a unidirectional draw for film subsequently to be drawn in a direction at right angles. If it is intended to produce a shrinkable film, uncrystallised layers should not be drawn at temperatures greater than 100° C., preferably not greater than 90° C., since at temperatures above this, excessive crystallisation will occur during drawing and the film produced will not be shrinkable. Crystalline layers are best drawn at higher minimum temperatures, otherwise there is a tendency for them to break. The maximum drawing temperature which may be used when the resultant film is not required to be shrinkable may be as high as 200° C. since we have found that even at this temperature a large amount of orientation is induced in the film. Normally however, we find it unnecessary to draw at temperatures above about 150° C.

The films of our invention may be of the non-turbular and tubular varieties. The former may be made by non-tubular processes and by slitting film made by a tubular process. Tubular film may be made by sealing together the edges of non-tubular film. Seamless tubular film may be produced by the tubular process.

We find that the layers crystallised before drawing can be drawn to higher tensile yield strengths and stiffnesses than uncrystallised layers. However the former present difficulties in sequential drawing processes in that, if the draw temperatures and ratios are not carefully controlled within restricted limits highly unbalanced film may be produced. In fact such firms are most easily produced by simultaneous drawing processes, of which the most fully developed is the tubular process. For the operation of such a process for the production of layers for producing our films a cooling die is normally required, because of the mobile nature of the polymer. Because tubular processes and other simultaneous drawing processes are not yet suited to the production of films of the best thickness uniformity and flatness, our films are also very usefully prepared from amorphous layers which are drawn sequentially. This last method is also very suitable for the production of transparent film particularly when the layers formed for drawing are quenched to below 60° C. after extruding at relatively high extrusion temperatures, e.g. from 300–330° C., preferably from 310–315° C. Such quenched layers may also be used for the production of transparent crystallised film.

The films of our invention if not caused to crystallise are heat shrinkable films. The wider utility is for those of our films which have been crystallised and do not have this tendency to shrink.

Our films exhibit good resistance to ultraviolet light degradation compared with films of polyethylene terephthalate. This can be shown by exposing the two types of films under conditions of 65% relative humidity to ultraviolet light from a water-cooled xenon arc lamp according to ASTM designation E 239. The results obtained (from the film of Example II) are shown graphically in FIG. I from which it can be seen that although the polyethylene terephthalate film was reduced to zero strength after two days, the film according to our invention, still retained approximately 80% of its tensile break strength and, even after seven days retained 60% of its tensile break strength.

Our films also show excellent resistance to degradation due to extended periods at elevated temperature as compared to polyethylene terephthalate film. This was demonstrated by maintaining samples of both films at 170° C. The results of this test (on the film of Example II) are shown in FIG. II from which it can be seen that after 8 days our films had lost only 30% of their strength as compared with a 50% loss in strength by the corresponding polyethylene terephthalate film.

The permeability of our films, particularly of the crystallised films to various gases was measured and it was found that it had permeabilities measured as transmission rates at 25° C. in cubic centimetres at N.T.P. per square metre of film per day of less than 12 to nitrogen less than 45 to oxygen and less than 125 to carbon dioxide. The figures obtained for oxygen and carbon dioxide were considerably less than those found in the case of polyethylene terephthalate and those for nitrogen similar to those of polyethylene terephthalate film. In the case of water vapour (the latter being measured by B.S. 3177 and of the order of 10 g. per square metre per day) the figures were again considerably less than for polyethylene terephthalate film.

Our film is particularly suitable for use in electrical applications since it has a particularly high permittivity being about twice that of polyethylene terephthalate film.

Various additives, e.g. fillers comprising finely divided particulate materials, dyes, pigments, light stabilisers or antistatic agents may be incorporated in the films according to our invention. Examples of suitable fillers include titanium dioxide, silica (including diatomaceous silica), silicates and alumino-silicates, e.g. clays, abrasives such as powdered glass or Carborundum and decorative materials such as talc, ground mica or ground mother-of-pearl.

The concentration of the additive and, in the case of solid materials, its particle size will depend on the nature of the additive and the purpose for which the film is to be used. For example, in the case of a pigment or dye we prefer the concentration to be from 0.01% to 5.0% by weight. In the case of a filler such as silica or a silicate which confers a matte "write-on" surface to the film from 1% to 10% by weight and of particle size from 0.1 to 10 microns may be added. In the case of a substance, e.g. clay, added to improve the slip properties of the film the preferred concentration is from 0.05% to 5.0% by weight and the preferred particle size from 0.01 to 10 microns. In the case of decorative materials the preferred concentration of inert filler is from 1% to 15% by weight and the preferred particle size from 1 to 20 microns. In the case of abrasives, e.g. ground glass or carborundum, concentrations of from 1% to 15% by weight and particle sizes of from 0.005 inch to 0.100 inch may be used. For applications where the film is subjected to violent mechanical action, e.g. stamping or creasing, we prefer to use from 0.25% to 10% by weight of a filler having a particle size range of from 0.1 to 2.0 microns and a very narrow distribution of particle size, e.g. titanium dioxide of particle size approximately 0.2 micron.

Our films also may be laminated to other materials which may or may not be themselves in the form of films. For example they may be laminated to wood, to paper, to metals or to other thermoplastics. The films so laminated may or may not contain any of the additives listed above and a particularly useful type of laminate is one in which a film according to our invention and containing no additive is laminated to a second film which may be of polyethylene-1:2-diphenoxyethane-4:4'-dicarboxylate, of another polyester, e.g. polyethylene terephthalate or of any other thermoplastic material which second film contains such an additive. The effect of the additive may thus be obtained without necessarily incurring possibly undesirable other effects, e.g. a matte surface giving a good write-on surface or surfaces may be obtained without unduly reducing transparency by laminating an unfilled film so that it forms the central layer between two filled films according to our invention.

A further very useful class of laminates are those with thermoplastic materials which are heat sealable. Examples of such laminates are those with polyethylene, polyvinyl acetate, partially hydrolysed polyvinyl acetate, vinyl chloride/vinyl acetate copolymers, ethylene/vinyl acetate copolymers, butadiene/methyl methacrylate copolymers, butadiene/methyl methacrylate/styrene copolymers and methyl methacrylate/methacrylic acid copolymers. A further group of thermoplastics, which when laminated with our films confers not only heat sealability but also impermeability to water vapour and other gases, includes copolymers of vinylidene chloride with one or more of acrylonitrile, itaconic acid, acrylic acid or vinyl chloride. Any of the above heat sealable thermoplastics when laminated to our films may of course contain any of the additives listed above but antistatic agents (cationic, anionic or nonionic), antioxidants, dyes, pigments, lubricants, anti-blocking agents, ultraviolet light stabilisers and slip agents (finely divided solids or waxes) are among those additives which may conveniently be added to the heat sealable thermoplastic.

The films of our invention may also have their surface modified, e.g. by the application of a very thin coating of heat sealable, antistatic or ultraviolet light stabilising material (although because of their already high stability to ultraviolet light this is seldom required) or by the application of a slip coating comprising particulate material, e.g. of silica or alumino silicates, or of thermoplastic polymers such as polyvinyl chloride or polymethyl methacrylate. Slip coatings of polymethyl methacrylate of particle size from 0.1 micron to 2.0 microns are particularly useful since they increase the slip of the film without markedly increasing its haziness. The surface may also be modified by embossing, by mechanical roughening or by sand blasting. Very thin reflective coatings of a metal such as aluminium may also be formed on the surface of our films. Such metallic coatings may range in thickness from $10^{-7}$ to $10^{-6}$ inches.

The methods used in the production of filled, laminated and surface modified films will now be described.

Fillers and other additives which do not undergo any chemical reaction with the polymer or polymer-forming reactants may preferably be incorporated into these materials and the resultant composition extruded to give the additive-containing film. Such a procedure, especially when applied at the polymerisation stage leads to a more uniform dispersion of the additive in the film. Laminates comprising an outer layer or layers containing an additive may be produced by the extrusion through a multichannel die in which polymer containing additive is fed to one or more channels and polymer without additive to the remaining channels. Such a film and process for its production is described in our copending U.S. application, Ser. No. 525,356, filed Feb. 7, 1966.

Laminates may be formed by first treating the films according to our invention with an adhesive such as low molecular weight polyesters and copolyesters used either alone or in conjunction with an isocyanate, and then applying an already formed film of the heat sealable thermoplastic material with the accompaniment of heat and pressure, e.g. between hot nip rollers. Such a process may conveniently be used in laminating our films to films of polyethylene or polypropylene, or to metallic foils, e.g. of tin or aluminium.

An alternative method of laminating our films to thermoplastic materials and particularly to heat sealable thermoplastic materials is to apply the material to our film as a melt coating, from a solution, or from aqueous dispersion. Although the adhesion of such coatings to the oriented films of our invention is high, it may be necessary for particular coatings to pretreat the surface of the oriented film to render it more receptive to the coating and thus produce a stronger adhesion between the base film and the heat seal coat. This may be done by a surface oxidation of the film, e.g. by chemical oxidants with for example potassium dichromate, chloracetic acid or ozone, by flame treatment of the surface of the film (with or without causing any melting of the film surface), or by corona discharge treatment in air or in another gas or mixture of gases, e.g. chlorine, sulphur dioxide or ozone. Thin coatings of a primer may be applied, e.g. alkyl titanates or polyalkylene imines.

One very effective method of obtaining an oriented film, the surface of which is more receptive to a heat seal coating, is to apply to the unoriented or partly oriented film a coating of a thermoplastic polymer at least fifty times thinner than the thickness of the unoriented film, the thermoplastic polymer having a melting point lower than the orientation temperature and having at least one carbon atom with a polar substituent per every six carbons of the polymer chain. Such a process is described in our copending U.S. application, Ser. No. 600,116, filed Dec. 8, 1966, now abandoned, and this process may also be used to apply antistatic agents, ultraviolet stabilisers, antioxidants or slip coats to our films, or to improve their receptivity to dyes or printing inks, over the already good characteristics which they have in this regard without such treatment.

To avoid pretreatment of the oriented film prior to heat seal coating, the coating may be applied to the unoriented or, in the case where the film is drawn in more than one stage, to the partly oriented film and then the orientation of the film carried out or completed. This leads to an excellent adhesion between the film and the heat seal coat.

A further method of treating our films in order to make them more readily heat sealable is to subject their surface to a flame treatment which may be carried out by passing the oriented film to be treated over a chilled roller while applying a flame of intense heat to the upper surface of the film for a sufficient time to cause the surface of the film to melt but for insufficient time to cause distortion of the film. The film following this treatment has an uncrystallised layer on the surface and can thus be heat sealed at a temperature of from 160° C. to 230° C. and using a pressure of 5 p.s.i. for 2 seconds give heat seal strengths of from 70 to 200 g./inch.

The increased modulus and yield strength of our films allows them to be successfully used for many applications in thicknesses considerably less than those employed for polyethylene terephthalate film. In the following examples of uses for our films, where we use the term "gauge" we mean a unit of $10^{-5}$ inches.

They can be used in the production of magnetic recording sound and video tapes in thicknesses as low as 25 gauge or even 5 gauge.

Our films may be used in other electrical applications, for which they are particularly useful because of their above mentioned high permittivity, for example, in the production of capacitors for which films generally of less than 100 gauge is used and in the case of very small capacitors which increasingly are being used in the electronics industry of thicknesses as low as 5 gauge. The films used for capacitors may contain fillers to improve their slip and so the ease of wrapping and a particularly suitable filler is titanium dioxide of particle size less 1 micron.

They may be used for cable lapping, for which a requirement is high yield stress and film of our invention of thickness as low as 25 gauge may be used in this application. They may be used in the production of other electrical and electronic components such as for example coil formers or in the production of chokes, coils and relays in which the film forms an interlayer between the various windings of the electrical component. Another example of this type of use is in interphase insulation in poly-phase electrical machines, e.g. three-phase electrical motors. The thicker films covered by the present application, i.e. 500–650 or 750 gauge may be used for slot liners and laminates between the present films and paper, and synthetic fibres, e.g. polyethylene terephthalate fibre, may be used for slot liners and slot closures and their good resistance to high temperature degradation makes them particularly suitable for this for temperatures up to about 155° C. In applications which required higher working temperatures still, e.g. up to 180° C. laminates with glass fibre or with mica may be used. They may also be used in the production of printed circuits which may be used for example in the wiring of motor vehicles and in other applications in which it is desirable to have a flexible printed circuit unit. A similar application is in the production of ribbon cables which allow wiring to be placed, e.g. behind wallpaper. They may also be used in the production of insulating or other tapes which may be coated with an adhesive or a pressure sensitive adhesive and in the production of corrugated or embossed film which latter is useful in the case of film less than 200 gauge thick, e.g. in cable lapping since the corrugations or irregularities of the surface reduce any slippage between layers of the lapping which may occur on bending of the cable, and in winding of transformers which are then soaked in a varnish to increase the mechanical strength since the varnish can then permeate through the capillaries formed between successive layers of the embossed or corrugated film. They may also be used in the production of loudspeakers and, when metallised, in the production of electrostatic loudspeakers.

The films of our invention can be used as a covering and/or backing for acoustic tiles, e.g. in hospitals where quietness combined with cleanliness is, of course, of the greatest importance, in glazing and double glazing and for lining hoses to impart chemical resistance to the hose. Such hoses are resistant to alkali as well as acid and thus represent an improvement over hoses lined with polyethylene terephthalate which is not particularly resistant to alkali. They may be laminated with felt or with bitumin to produce a material suitable for use as a roofing felts or in the construction of a damp course, or they may be laminated with wood, paper, metal or other materials when they can be used for decorative applications and in book binding. They may be used as an interlayer in the production of safety glass and the thicker films, e.g. 500–650 or 750 gauge may be used as windshields e.g. for motor cycles and motor scooters, as diaphragm in pumps, e.g. electric petrol pumps or in control instruments or in speech transmitting diaphragms and they may be used as gaskets or as bursting discs. They may be used in the production of webbing, e.g. for upholstery or basket making and when perforated they can be used as a leather substitute, e.g. in the production of shoes, handbags and other leather-substituted goods. The perforated film may also be used in the production of surgical dressings. The film can also be used in the production of high altitude meterological balloons and for windows in the sails of boats. The thickest films produced according to our invention may be used as the impact-receiving section of a drum. Thinner films, e.g. of 200 to 500 gauge, as the diaphragm which is in contact with the snare wire of a side drum.

They may be used in packaging, the films which have not been heat treated being especially useful for shrink packaging, and in the production of special purpose packages, e.g. "boil-in-the-bag" packages, e.g. food packages, or in packing articles which can be heat sterilised while remaining within the package. The film in tubular form is useful as sausage skin. When laminated with tin foil they can be used in the production of cap wads. They can be used for producing adhesive tapes and labels and for tear tapes. They may be used as display card holders or laminated to printed paper, e.g. to give weather-proof maps. Metallised film may be used for many of the applications mentioned above and is particularly useful in producing labels and adhesive tapes, in producing mirrors, decorative laminates, e.g. with wood, paper or other plastics. For example a metallised film may be laminated to a formed strip of PVC and used as a replacement for chrome strip, e.g. in surrounding car windscreens. Metallised film also may be used in the production of thin tapes or threads which can be woven into fabric to produce decorative effects. Metallised film may also be used in the production of stamping foils in which the base-film is coated first with a release coating, then metallised, then coated with an adhesive which can be activated by heat; this laminate is then placed on the surface to be treated and heat applied to the desired part of the film; when the laminate is stripped from the surface to be treated the metallised layer remains only over those parts which were heat treated. This process is used in particular in the process of gold lettering, but it may also be used for any other metal or other material which can be deposited as a thin layer on to the film.

The films may be used as a base for carbon paper and, particularly when containing inert filler as described above, as a drafting film for drawing office use. Such a drafting film may be coated, e.g. with a photographic emulsion when it may be used in a diazo coating process. The increased rigidity of our film over polyethylene terephthalate film promotes the use in this application of thinner film than was heretofore acceptable. It therefore allows the use of higher filler concentrations in the film and so better write-on characteristics for the same translucency and so the same usefulness as tracing material.

A preferred application especially for the thicker films, e.g. 450–650 gauge, is as a base for X-ray photographic film in which case they preferably contain a blue dye as an additive. Films of thickness 150–750 gauge may be used as a base for other photographic and cinematographic films. They may also be used as a printing base, e.g. in silk screen printing. For these photographic and drawing office applications a low shrinkage of our film is particularly useful. They may be used in book binding and for tracing paper, in the latter case preferably when containing an inert filler. They may be used as typewriter ribbons and, owing to the high yield stress can be used in this application in thinner gauge than was heretofore possible with polyethylene terephthalate film, thus allowing a longer length of film to be wound on a standard diameter roll of typewriter ribbon or for use in high speed printing heads, e.g. those attached to a computer where high tensile yield strengths are important. They may be also used for the punch tape to be fed to a computer or they may be used for ticker tape. They may be used in the form of a strip or discs to reinforce the holes in loose-leaf paper, or in the case of the thickest films, e.g. 600–750 gauge for garment stiffeners, e.g. collar stiffeners, when they preferably contain a filler which has a narrow distribution of particle size as described above.

The films of our invention which have not been drawn to the maximum degree practically possible and preferably those which have been drawn less than three times may be shaped either at elevated temperatures, e.g. 60° C. to 150° C., by techniques such as vacuum forming or at room temperature by the press-forming techniques such as pressing, cupping, ironing and sinking which are well known in working sheet metal. Of these the most useful technique we find is vacuum forming especially for films of 50 to 300 gauge in thickness. Where unheat-treated (shrinkable) film is used in vacuum forming, the film must be cooled to below 60° C. between the vacuum is released to prevent shrinkage. A preferred use for such vacuum formed film (whether shrinkable or crystallised) is in the production of blister packages.

Other uses include the production of rainwear, washable wallpaper, preferably with added filler to reduce the surface glossiness, measuring tapes for which they are suited because of their thermal stability, conveyor belts, particularly in uses where a high standard of hygiene is required, e.g. in battery chicken houses, as mold release agents, e.g. in the production of shaped articles from fibre glass, as a protective cover of the hull of ships and boats and as a thermal insulating material.

Our invention is illustrated but in no way limited by the following examples.

EXAMPLE I

Polyethylene - 1:2 - diphenoxythane-4:4′-dicarboxylate having a relative viscosity (measured as a 1% solution in o-chlorophenol) of 2.09 was extruded at a temperature of 280° C. quenched at 23° C. as a flat layer and drawn simultaneously two times in the longitudinal direction and to the same extent in the transverse direction. Further similar extruded samples were drawn 2.5, 2.7 and 3.0 times in each direction. Draw temperatures of between 80° C. and 90° C. were used in each case. The properties (which were substantially the same in all directions in the plane) of the resultant films are set out in the following table:

| Draw ratio | Tensile yield strength, p.s.i. | Tensile break strength, p.s.i. | Elongation at break, percent | 1% secant modulus, p.s.i. |
|---|---|---|---|---|
| 2.0×2.0 | 15,000 | 22,000 | 165 | |
| 2.5×2.5 | 16,000 | 24,500 | 135 | |
| 2.7×2.7 | | | | 6.5.10$^5$ |
| 3.0×3.0 | 17,000 | 29,500 | 115 | |

EXAMPLE II

A further sample of the polymer used in Example I was continuously extruded at a temperature of 280° C. from a slit die onto a chilled rotating casting drum maintained at 23° C. at a rate of 70 lb./hour. The cast film was 13″ wide and 0.01″ thick. The film was preheated to 70° C. and then forward drawn 3.3 times between slow and fast rollers at a temperature of approximately 85° C. beneath infrared heaters. The forward drawn film was then preheated to 105° C. and transversely drawn 3.3 times at this temperature in a stenter. Before being wound up, it was subjected to a temperature of 210° C. while restraining from shrinkage to effect crystallisation. The resultant film was 0.001″ thick and had the following properties:

Tensile yield stress: 15,000 p.s.i.
Tensile break stress: 29,000 p.s.i.
Elongation at break: 90%
1% secant modulus, $8.10^5$ p.s.i.
Tear propagation resistance: 22 g. cm./cm.

The above properties had substantially the same values whether measured in the longitudinal direction or the transverse direction.

Folding endurance under
  1,000 p.s.i. _____ About 180,000 cycles.
Shrinkage when held at
  200° C. for 1 minute _____ 2.5% in the longitudinal direction; 3.5% in the transverse direction.
Resistance to ultraviolet light __ As shown in FIG. I and discussed above.
Resistance to heat ageing _____ As shown in FIG. II and discussed above.
Gas permeability (nitrogen) __ 11.5 cc. at N.T.P. per sq. metre per day.
Gas permeability (oxygen) ___ 37.6 cc. at N.T.P. per sq. metre per day.
Gas permeability (carbon
  dioxide) _____ 105 cc. at N.T.P. per sq. metre per day.
Gas permeability (water
  vapour) _____ 10 g. per. sq. metre per day.

EXAMPLE III

The conditions of Example II were repeated with the exception that the extruded polymer contained 0.125% of china clay. The same properties were measured as in the case of the films of Example II and substantially the same results were obtained in each test except for the gas permeability in which case the results were:

Per sq. metre per day
Gase permeability (nitrogen) _____ 11.6 cc. at N.T.P.
Gas permeability (oxygen) _____ 43.6 cc. at N.T.P.
Gas permeability (carbon dioxide) __ 120 cc. at N.T.P.
Gas permeability (water vapour) ____ 9 g.

For comparison the gas permeability of a similar film of polyethylene terephthalate were measured and found to be as follows:

Per sq. metre per day
Nitrogen _____ 13 cc. at N.T.P.
Oxygen _____ 90 cc. at N.T.P.
Carbon dioxide _____ 250 cc. at N.T.P
Water vapour _____ 20 g.

EXAMPLE IV

Polyethylene-1:2-diphenoxyethane-4:4′-dicarboxylate of relative viscosity 2.07 was extruded at a temperature of 310° C., quenched at 15° C. as a flat layer and drawn simultaneously in the longitudinal and transverse directions to a draw ratio of 2.0 in each direction and at a temperature of 95° C. The process was repeated using draw ratios in each direction of 2.5, 3.0, 3.5 and 3.75 and the results obtained on the un-heat set film are set out in the following table:

| Biaxial draw ratio | Yield stress (p.s.i.) | Breaking stress (p.s.i.) | Elongation at break percent |
|---|---|---|---|
| 2.0×2.0 | 14,400 | 16,500 | 58 |
| 2.5×2.5 | 16,300 | 22,500 | 38 |
| 3.0×3.0 | 19,500 | 24,000 | 35 |
| 3.5×3.5 | 23,000 | 31,200 | 29 |
| 3.75×3.75 | 26,500 | 35,000 | 41 |

I claim:
1. Biaxially oriented films of polyethylene-1:2-diphenoxyethane-4:4′-dicarboxylate of thickness 0.00005″ to 0.0075″ thick having in combination tensile yield strengths of at least 15,000 p.s.i., tensile break strengths of at least 20,000 p.s.i., 1% secant tensile moduli of at least $6.10^5$ p.s.i. and preferably with a shrinkage when heated for 1 minute at 200° C. of less than 4%, these properties being measured in all directions in the plane of the film, said film also being resistant to degradation by heat and by ultraviolet light.

2. Films according to claim 1 of thickness 0.00005″ to 0.0065″.

3. Biaxially oriented films consisting essentially of polyethylene-1:2-diphenoxyethane-4:4′-dicarboxylate of thickness 0.00005″ to 0.0075″ thick having in combination tensile yield strengths of at least 15,000 p.s.i., tensile break strengths of at least 20,000 p.s.i., 1% secant module of at least $6.10^5$ p.s.i. and preferably with a shrinkage when heated for 1 minute at 200° C. of less than 4%, these properties being measured in all directions in the plane of the film, said films also being resistant to degradation by heat and, upon exposure to ultraviolet light under conditions of 65% relative humidity, retaining at least 80% of their original tensile break.

References Cited

UNITED STATES PATENTS

| | | | |
|---|---|---|---|
| 2,503,251 | 4/1950 | Edwards et al. __ | 260—470CUX |
| 2,990,306 | 6/1951 | Dyer _____ | 161—165 |
| 3,200,086 | 8/1965 | Coleman _____ | 260—47CX |
| 3,256,379 | 6/1966 | Heffelfinger _____ | 264—210X |
| 3,299,194 | 1/1967 | Golike _____ | 264—210 |
| 3,340,231 | 9/1967 | Fertig et al. _____ | 260—47C |
| 3,351,624 | 11/1967 | Conix _____ | 260—47C |
| 3,351,697 | 11/1967 | Hufnagel et al. ___ | 264—210X |
| 3,374,201 | 3/1968 | Wiener _____ | 260—47C |

JOHN T. GOOLKASIAN, Primary Examiner

G. W. MOXON II, Assistant Examiner

U.S. Cl. X.R.

161—231, 402, 411; 260—47; 264—210, 289